C. SENG.
PIPE COUPLING.
APPLICATION FILED DEC. 23, 1915.
1,322,357.  Patented Nov. 18, 1919.
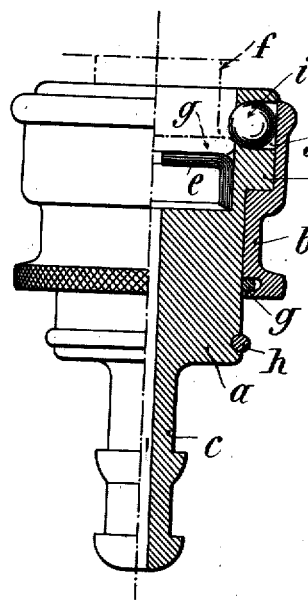
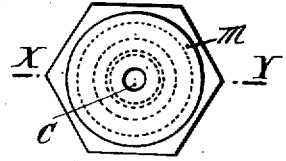
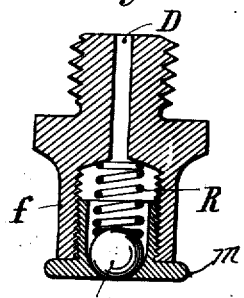
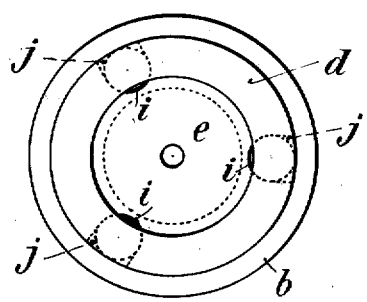
Inventor:
Camille Seng,
by Haseltine, Lake & Co.,
atty.

UNITED STATES PATENT OFFICE.

CAMILLE SENG, OF ROMILLY-SUR-SEINE, FRANCE.

PIPE-COUPLING.

1,322,357.  Specification of Letters Patent.  Patented Nov. 18, 1919.

Application filed December 23, 1915. Serial No. 68,431.

*To all whom it may concern:*

Be it known that I, CAMILLE SENG, a citizen of the French Republic, and a resident of Romilly-sur-Seine, Department of the Aube, in the Republic of France, have invented certain new and useful Improvements in Pipe-Couplings, of which the following is a specification, reference being had therein to the accompanying drawing.

The present invention relates to an instantaneous joint for fluids under pressure, characterized essentially by the fact that both parts of the joint are connected or separated from each other by the longitudinal displacement, upon one of the said parts, of a controlling sleeve intended to operate balls; these means being adapted to engage or not with the other part of the joint which, to this end, is provided with a connecting flange or the like means. The joint may, more particularly, be constituted by a body comprising a chamber within which the other part of the joint may be introduced, which rests or bears on a resilient packing insuring fluid-tightness of the joint. The connection is effected by means of balls which project into the said chamber and are located in recesses formed in the joint; the said balls actuated in opposition to their active connecting parts by means of the controlling sleeve without the assistance of intermediate members.

This instantaneous joint is more particularly applied in the case where it is desired to have forced lubrication with oil, grease and so on. In this case the joint which is connected to the piping of the delivery mechanism of a pump or the like, may be secured as desired by the operation of the sleeve actuating the balls upon the connecting flange with which the lubricator must be provided for that purpose. This flange may be formed upon the cap which closes the lubricator and which comprises an opening constituting a seat for the obturator subjected to the action of an internal spring.

The accompanying drawings illustrate, by way of example, a constructional form of the invention.

Figure 1 shows partly in elevation and partly in vertical section, a constructional form of the instantaneous joint forming the subject matter of the invention.

Fig. 2 is a corresponding sectional plan.

Figs. 3 and 4 show in vertical section taken on line X Y and in plan, respectively, a constructional form of ball lubricator which has been more particularly designed for use in conjunction with the instantaneous joint in the case of forced lubrication.

This new joint consists of a tubular body $a$, and an operating or controlling sleeve $b$ adapted to slide on the said body $a$.

At one of its ends, the body $a$ is constructed so as to form a pipe $c$ intended to receive the pipe connecting the joint with the supply apparatus, such as lubricator, pump or other apparatus. At its opposite end, the body $a$ forms a hollow head $d$ having seated therein a fluid-tight washer $e$ constituted by a piece of cupped leather, against which bears the end of the pipe $f$ of the working apparatus to be connected. This pipe $f$ comprises at its end a small flange $g$ adapted to engage with a certain number of balls $i$ (three in the illustrated example), arranged at equal distances from one another in radial recesses $j$ formed in the head $d$.

The thickness of the annular portion of the head $d$ and the diameter of the balls $i$ are designed in such a manner that the said balls project into the interior of the recess formed in the head $d$ when, the sleeve $b$ being operated, these balls bear against the inner wall of the said sleeve.

A split ring $h$ located in a groove formed in the body $a$ projects around the latter in order to limit the travel of the sleeve $b$. This travel is designed in such a manner that when the sleeve $b$ is drawn to the rear it permits of the disengagement of the balls $i$ but sufficiently covers the recesses $j$ to prevent the said balls from dropping out.

Under these conditions, in order to connect the tubular body $a$ with the pipe $f$ it is sufficient, after having previously displaced the sleeve $b$ to the rear, to introduce the said pipe $f$ into the head $d$ so that the small flange $g$ will bear against the washer $e$, between the latter and the balls $i$. As soon as the parts are in such contact, the sleeve $b$ is pushed. This movement has for its effect to cause the balls $i$ to converge toward the axis of the joint so that they will slide against the rear portion of the flange and cause the same to bear with pressure against the fluid-tight washer $e$.

In order to disengage the joint it is sufficient to draw the sleeve $b$ to the rear.

In this new joint, the engaging and disengaging operations may be performed very easily by means of one hand only, the only movement to be effected consisting in sliding in a straight line the sleeves *b* on the body *a*, which movement takes place by itself under the effect of the introduction or withdrawal of the joint.

This instantaneous joint which may be used for insuring the junction of the two conduits wherein any fluid circulates and in particular, wherein any fluid under pressure circulates, may be used particularly in the case of forced lubrication with oil or grease. To this end recourse may be had to a ball lubricator forming an obturator and comprising an external flange for securing and fixing the joint.

Referring to Figs. 3 and 4, this lubricator is constituted by a hollow body *f* formed with a conduit D for the lubricant. A screw-threaded extension permits of placing the lubricator in place. In the chamber within the body *f* which is formed with a screw-thread, a plug *m* is screwed, provided with the flange against which the balls *i* are designed to engage, so as to effect a joint with the pump intended to deliver the lubricant. In the illustrated example, the plug *m*, is, moreover, hollowed out internally so as to receive a ball C constantly pushed against its seat by an inner spring R thus insuring closure of the lubricator.

It should be noted that the pressure of the fluid exerts itself within the chamber formed by the piece of cupped leather *e* in the direction of application of the same against the end of the pipe *f*.

What I claim and desire to secure by Letters Patent of the United States is:

A coupling comprising a tubular member provided at one end with an external annular shoulder, said shoulder having substantially radial seats therein which are open at their inner and outer ends and communicate with the interior of the coupling, a ball in each of the seats, the outer end of each socket being open for the introduction and removal of the ball and the inner end of the seats being restricted to permit of the ball extending a limited distance into the interior of the coupling, said coupling being provided with an internal shoulder inward of the seats, a slidable sleeve embracing the tubular member and normally closing the outer ends of the seats, said sleeve having an internal shoulder for engagement with the inner end of the annular shoulder on the coupling member to limit movement of the sleeve in one direction, and a ring sprung into an external groove on the coupling member in position to limit movement of the sleeve in the opposite direction.

In testimony whereof CAMILLE SENG has affixed his signature.

CAMILLE SENG.